US010557758B2

(12) United States Patent
Lu et al.

(10) Patent No.: US 10,557,758 B2
(45) Date of Patent: Feb. 11, 2020

(54) NON-CONTACT MAGNETOSTRICTIVE SENSOR WITH GAP COMPENSATION FIELD

(71) Applicant: General Electric Company, Schenectady, NY (US)

(72) Inventors: Dan Tho Lu, Minden, NV (US); Pekka Tapani Sipila, Garching N. Munich (DE); Lam Arthur Campbell, Houston, TX (US); Brian F. Howard, Minden, NV (US)

(73) Assignee: General Electric Company, Schenectady, NY (US)

( * ) Notice: Subject to any disclaimer, the term of this patent is extended or adjusted under 35 U.S.C. 154(b) by 307 days.

(21) Appl. No.: 15/598,062

(22) Filed: May 17, 2017

(65) Prior Publication Data

US 2018/0335353 A1    Nov. 22, 2018

(51) Int. Cl.
*G01B 7/14* (2006.01)
*G01D 5/14* (2006.01)
*G01D 5/12* (2006.01)
*G01L 1/12* (2006.01)
*G01D 5/24* (2006.01)

(52) U.S. Cl.
CPC .............. *G01L 1/125* (2013.01); *G01D 5/24* (2013.01)

(58) Field of Classification Search
CPC .. H02J 7/025; H02J 50/90; H02J 50/10; H02J 50/60; G01L 1/125; G01L 3/105; G01L 3/102; G01L 1/127; G01L 1/122; G01V 3/10
See application file for complete search history.

(56) References Cited

U.S. PATENT DOCUMENTS

| 2,459,171 | A | * | 1/1949 | Langer | G01L 3/105 73/862.332 |
| 3,798,537 | A | * | 3/1974 | Dahm | G01L 5/045 324/209 |
| 4,566,338 | A | * | 1/1986 | Fleming | G01L 3/102 324/209 |
| 5,542,304 | A | * | 8/1996 | Sasada | B23Q 17/09 73/862.06 |
| 6,494,102 | B2 | * | 12/2002 | Hanisko | G01L 3/102 73/779 |
| 9,212,958 | B2 | * | 12/2015 | Campbell | G01L 1/122 |

(Continued)

*Primary Examiner* — Alesa Allgood
(74) *Attorney, Agent, or Firm* — Mintz Levin Cohn Ferris Glovsky and Popeo, P.C.

(57) ABSTRACT

Systems, devices, and methods for determining stress in a conductive target are provided. The systems, devices, and methods facilitate detecting stress in the target using a sensor assembly. Raw stress signals, which can correspond to stress in the target, can be generated by detecting a first magnetic flux that travels through the target. The raw stress signals can be sensitive to a gap between the sensor assembly and the target. A proximity sensor element can be used to determine the size of the gap by generating a magnetic field which can couple with the target. If the size of the gap changes, the coupling can change. By determining an impedance of the proximity sensor element, a corresponding gap signal can be generated. The gap signal can be used to correct the raw stress signals, thereby creating corrected stress signals, which can correspond to values of stress within the target.

25 Claims, 11 Drawing Sheets

(56) References Cited

U.S. PATENT DOCUMENTS

| | | | |
|---|---|---|---|
| 2014/0366637 A1* | 12/2014 | Brummel | G01L 3/105 73/779 |
| 2015/0323397 A1* | 11/2015 | May | G01L 1/125 73/779 |
| 2017/0078400 A1* | 3/2017 | Binder | H04L 67/12 |

* cited by examiner

NON-CONTACT MAGNETOSTRICTIVE SENSOR WITH GAP COMPENSATION FIELD

FIELD

Non-Contact stress measurement systems and processes are provided, and in particular systems and methods are provided for determining stress in a target.

BACKGROUND

Ferromagnetic materials can have magnetostrictive properties that can cause the materials to change shape in the presence of an applied magnetic field. The inverse is also true. When a force is applied to a conductive material, magnetic properties of the material, such as magnetic permeability, can change. A magnetostrictive sensor can sense the changes in magnetic permeability and, because the changes can be proportional to the amount of stresses applied to the conductive material, the resulting measurement can be used to calculate the amount of stress.

However, magnetostrictive sensors can be sensitive to a separation distance between the sensor and a target material.

SUMMARY

Due to the separation distance between a sensor and a target material, methods, systems, and devices, for correcting a magnetostrictive sensor output based on a separation distance are presented herein. Sensor systems, assemblies, and methods are provided for sensing stress in a target. In one embodiment, a sensor assembly is provided and includes a first support having a central arm, a drive element, at least one detection element coupled to the support and configured to detect the first magnetic flux, and a first proximity sensor element. The drive element can be located on the central arm of the first support and it can be configured to induce a first magnetic flux that travels through a target. The first proximity sensor element can be located at a fixed position relative to the at least one detection element and it can be configured to generate a second magnetic flux that travels through the target, and to generate a raw proximity signal based on a gap distance between the first arm and the target.

The assembly can vary in a number of ways. For example, the sensor assembly can have four detection elements that can be approximately equally spaced from the drive element and from one another. In one embodiment, the drive element can be configured to receive an alternating current drive signal at a first frequency to generate the first magnetic flux, and the first proximity sensor element can be configured to receive an alternating current input proximity drive signal at a second frequency to generate the second magnetic flux. In another embodiment, the first proximity sensor element can be on the first arm of the first support.

In other embodiments, the first proximity sensor element can be on a second support positioned a fixed distance from the first support. As another example, the sensor assembly can further include a second proximity sensor element on a third support positioned a fixed distance from the first support. In some implementations, the at least one detection element can be on a second arm of the first support. In other implementations, at least a portion of first support can be made of a ferrite material.

In another aspect, a sensor system is provided. The sensor system can include a sensor assembly for sensing stress in a target. The sensor assembly can have a housing containing a first support, a first subsystem, and a second subsystem having a proximity sensor element. The first subsystem can be configured to generate a raw stress signal, and the second subsystem can be configured to generate a raw proximity signal. The sensor system can further include a drive system configured to deliver an input stress drive signal to the first subsystem, and a proximity system configured to deliver an input proximity drive signal to the second subsystem and to generate a reference signal that corresponds to the input proximity drive signal.

In one embodiment, the first subsystem can include a drive element and at least one detection element. The drive element can be located on a first arm of the first support and it can be configured to induce a first magnetic flux that travels through a target, and the at least one detection element can be configured to detect the first magnetic flux and generate the raw stress signal. In some embodiments, the proximity sensor element can be on the first arm of the first support. In some implementations, the proximity sensor element can be on a second support.

In another embodiment, the sensor system can further include a gap processor configured to receive the reference signal and the raw proximity signal, to calculate an impedance of the proximity sensor element, and to generate a gap signal that is proportional to the impedance of the proximity sensor element. The sensor assembly can also include a gap compensation circuit. The gap compensation circuit can be configured to receive the raw stress signal and the gap signal and to generate a corrected stress signal. The corrected stress signal can correspond to a value of stress in the target.

In another aspect, a method for sensing stress in a target is provided. The method can include delivering an input stress drive signal to a drive element of a sensor assembly, thereby inducing a first magnetic flux that travels through a target. The method can further include detecting the first magnetic flux, generating a raw stress signal based on the detected first magnetic flux, delivering an initial proximity signal to a proximity circuit, and delivering a reference signal to a gap processing module. The reference signal can correspond to the initial proximity signal. The method can further include delivering an input proximity drive signal to a first proximity sensor element, generating first raw proximity signal based on an impedance first proximity sensor element, and calculating a gap signal from the reference signal and the first raw proximity signal. The gap signal can correspond to an impedance of the first proximity sensor element. A corrected stress signal can be calculated from the raw stress signal and the gap signal.

In some implementations, the gap signal can be proportional to the impedance of the proximity sensor element. In other implementations, the drive signal and the input proximity drive signal can be alternating current signals, and the input stress drive signal can be at a first frequency and the input proximity drive signal can be at a second frequency. In some embodiments, the second frequency can be at least ten times greater than the first frequency.

In some implementations, the proximity sensor element can generate a second magnetic flux in the target. Changes in the second magnetic flux can correspond to changes in the impedance of the first proximity sensor element.

In other implementations, the method can include delivering an input proximity drive signal to a second proximity sensor element, receiving a second raw proximity signal from the second proximity sensor element, and calculating a second gap signal from the reference signal and the second raw proximity signal. The second gap signal can be proportional to an impedance of the second proximity sensor element. A corrected stress signal can be calculated from the raw stress signal and the second gap signal.

DETAILED DESCRIPTION

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Certain materials, such as, e.g., shafts of a turbine, need to be monitored to ensure that they are functioning within an appropriate operating range. One way to test for potential damage is to sense a stress applied to the material. Since these materials are often formed from a metal and have magnetic properties, and any change in the magnetic property can be proportional to the amount of stress applied to the target, sensors can be used to detect changes in magnetic properties of the material. The sensor can generate a stress signal that corresponds to the amount of stress within the target. A distance between the sensor and the target, however, can impact the quality of the stress signal. Accordingly, it can be beneficial to include a proximity sensor that can determine the distance between the sensor and the target. If the distance is known, the stress signal can be corrected for changes in the distance, and a corrected stress signal can be determined.

Figure 1:
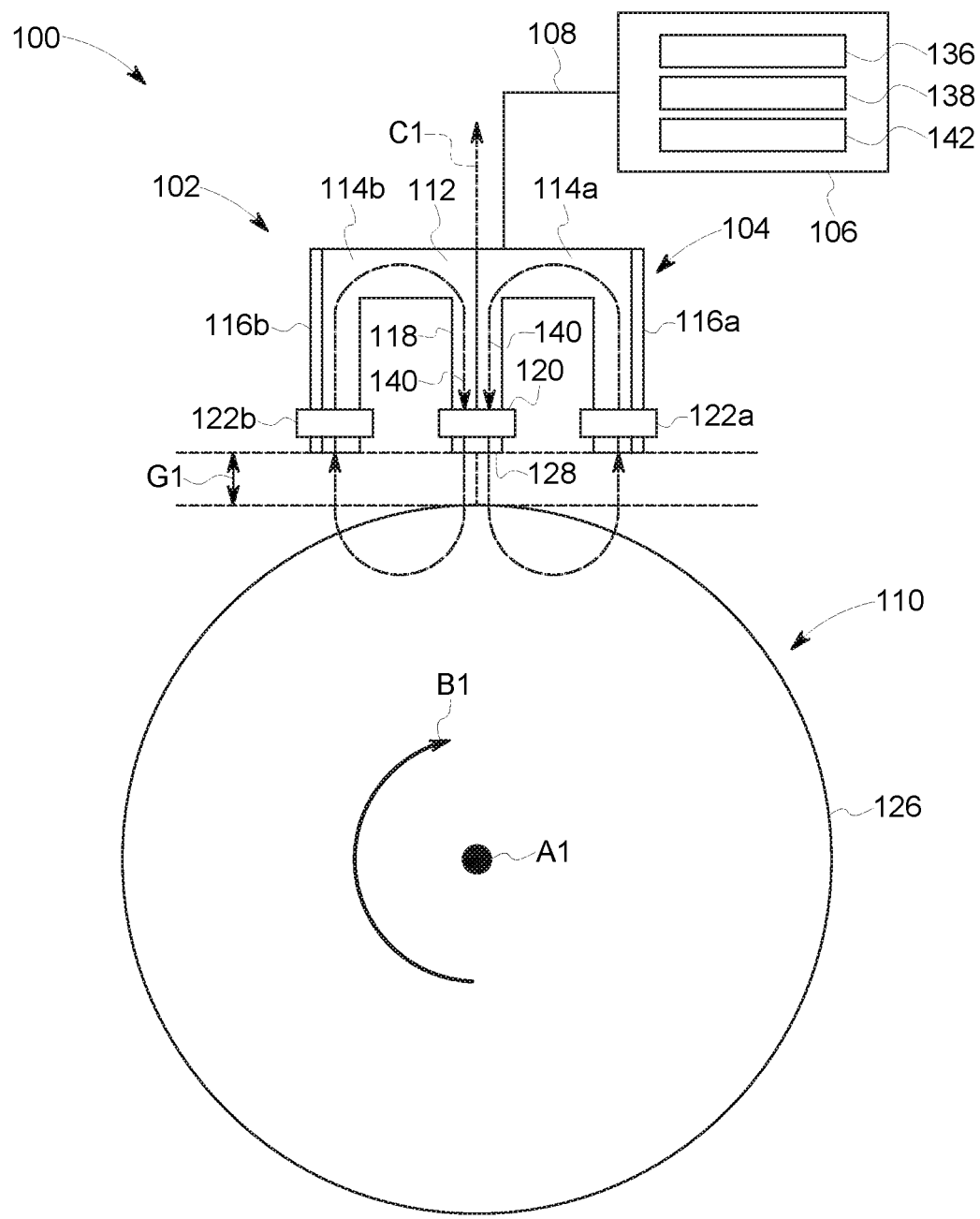
FIG. 1 is a side view of a sensor system for sensing stress such as torque, bending, and axial loading.

FIG. 1 illustrates a sensor system 100 for sensing stress such as torque, bending, and axial loading, applied to a conductive target. The sensor system 100 can include a sensor assembly 102 having a sensor head 104 and a housing (not shown), as well as a control and processing module 106. The sensor assembly 102 can be in communication with the control and processing module 106. As an example, the sensor assembly 102 can be connected to the control and processing module 106 via a cable 108 which can have multiple wires that can connect to components of the sensor head 104. The control and processing module 106 can be configured to send and receive signals to and from the sensor assembly 102. As shown in FIG. 1, the sensor assembly 102, including the sensor head 104, can be positioned over a target 110 which can rotate about axis A1, as indicated by arrow B1.

The sensor head 104 can include a support 112 that can have one or more support bars, for example, support bars 114a, 114b that extend radially outward from a central axis C1. The support 112 can be fabricated from a magnetic or ferromagnetic material such as, e.g., iron. Other possible materials that the support 112 can be made from can include, without limitation, ferrite material, silicon steel, nickel, cobalt, or other materials with high magnetic permeability. The support bars 114a, 114b can have one or more detection arms, for example, detection arms 116a, 116b that extend distally therefrom toward the target 110. Additionally, the support 112 can include a central arm 118 that extends distally toward the target 110 along the central axis C1. The detection arms 116a, 116b can be spaced equidistant from the central arm 118. The lengths of the central arm 118 and the detection arms 116a, 116b can be the approximately equal, as shown in FIG. 1, or they can be different.

The sensor head 104 can further include a drive subsystem. The drive subsystem can include a drive element 120 located on the central arm 118 of the support 112, and detection elements 122a, 122b located on the detection arms 116a, 116b. The drive element 120 and the detection elements 122a, 122b can be located at the same distal position on their respective arms 118, 116a, 116b. Alternatively, the drive element 120 can be located at a different distal position than the detection elements 122a, 122b. While only two support bars 114a, 114b and two detection arms 116a, 116b are shown, the support 112 can include any number of support bars and detection arms. In certain embodiments, each arm can be spaced equidistant from the central arm 118.

As shown in FIG. 1, the sensor head 104 can be positioned above a surface 126 of the target 110, with a gap G1 between a distal end 128 of the central arm 118 and the surface 126 of the target 110. The drive element 120 and detection elements 122a, 122b can function as inductors, and they can be made of, e.g., copper wire or any other material suitable for the described purposes. For example, one or more segments of copper wire can be wound around the arms 118, 116a, 116b, of the support 112 to create the drive element 220 and detection elements 122a, 122b.

In operation, a power supply 136 of the control and processing module 106 can deliver an initial drive signal to an excitation module 138 which can deliver an input stress drive signal to the drive element 120 such that a magnetic flux 140, corresponding to a magnetic field, can be generated in the central arm 118 of the support 112. The excitation module 138 can adjust, filter, and/or modify the initial drive signal, thereby generating the input stress drive signal that can be delivered to the drive element 120. The excitation module 138 can also monitor returned signals detected by the drive element 120. In some embodiments, the initial drive signal can be the same as the input stress drive signal. The input stress drive signal can be, e.g., an alternating current (AC) signal. The magnetic flux 140 can travel from the central arm 118, through the gap G1, through the target 110, through the detection arms 116a, 116b, and back to the central arm 118 to form magnetic loops. As the magnetic flux 140 travels through the detection arms 116a, 116b, the detection elements 122a, 122b can detect the magnetic flux 140, and generate raw stress signals which can be delivered to a detection module 142. The support 112 can function to increase the magnetic flux density. Although not illustrated, the drive element 120 and detection elements 122a, 122b can have wires attached thereto, which can allow the elements 120, 122a, 122b to communicate with the control and processing module 106, where the wires can be bundle into the cable 108. In some embodiments, the drive element 120 and the detection elements 122a, 122b can be freestanding, and not coupled to arms 116a, 116b of the support 112.

The raw stress signals can correspond to magnitudes of stress within the target 110. In some embodiments, the detection module 142 can employ active or passive filtering techniques to filter raw stress signals, thereby creating filtered raw stress signals. The raw stress signals can be current signals or voltage signals. Both amplitude and phase of the voltage, and/or current, signals can be measured. Although both current and voltage can be measured, it can be preferable to measure voltage since current measurements can have a relatively low signal to noise ratio.

Magnetic properties, such as magnetic permeability, of the target 110 can change as a result of a change in stress within target 110. Therefore, changes in the detected magnetic flux 140 can correspond to changes in the stress within target 110. Although changes in the detected magnetic flux 140 can correspond to changes in the stress state of the target 110, the detected magnetic flux 140 can also be sensitive to the size of gap G1, i.e. the distance between the terminal end of arms 118, 116a, 116b and the outer surface 126 of the target 110. Therefore, the raw stress signals, corresponding to the detected magnetic flux 140, can be a function of a stress state of the target 110 as well as the size of gap G1. Accordingly, it can be desirable to know the size of gap G1 so that the raw stress signals can be corrected based on the size of the gap G1, and a corrected stress signal can be determined.

Figure 2:
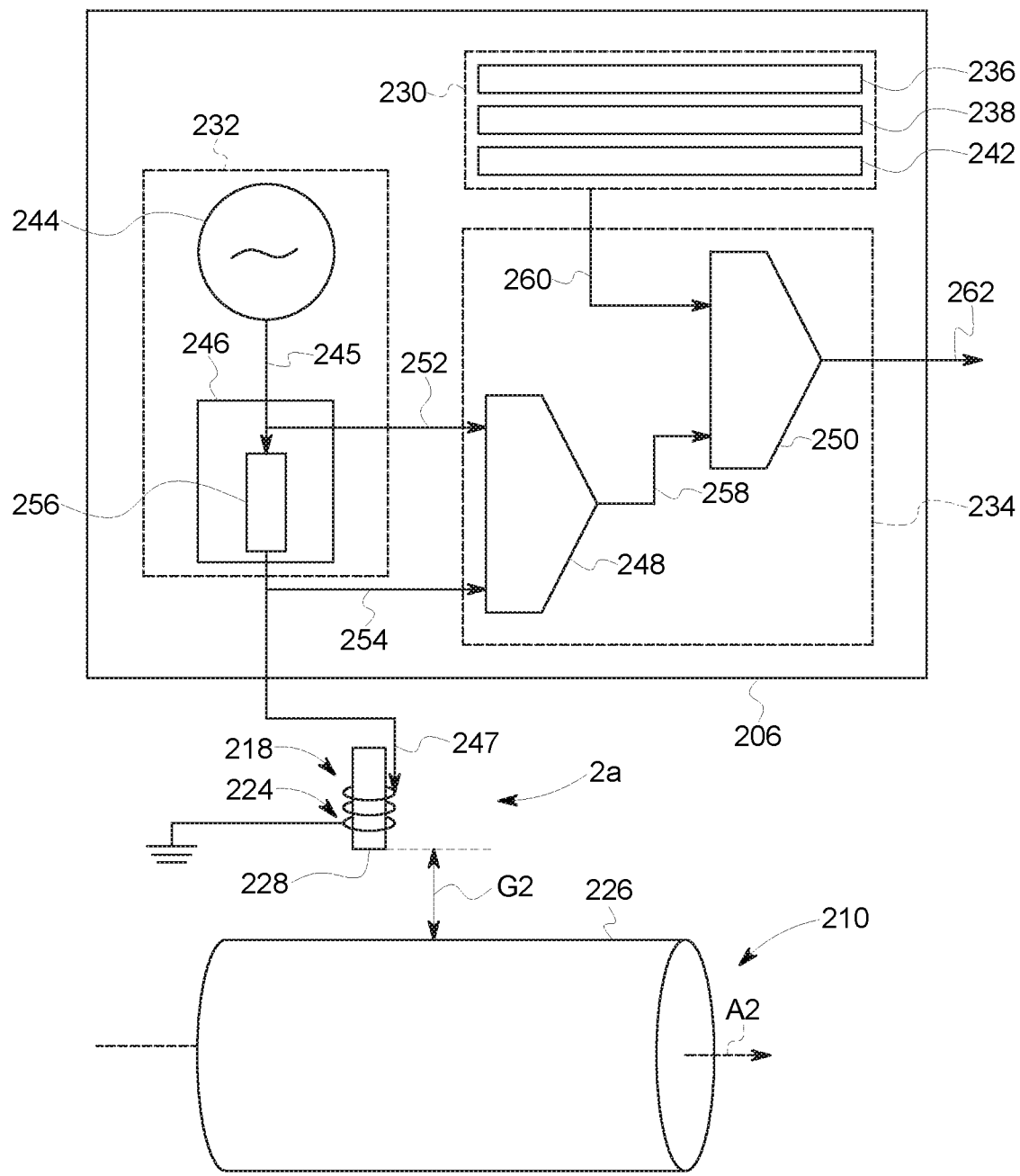
FIG. 2 is a diagram of a proximity subsystem and a control and processing module that can be used determine a size of a gap between a stress sensor and a target.

FIG. 2 shows a diagram of a proximity subsystem 201 and a control and processing module 206 that can be used within a sensor system similar to sensor system 100. The sensor system can include a sensor assembly having a drive subsystem including a drive element and at least one detection element. The drive element and detection element(s) can be similar to drive element 120 and detection elements 122a, 122b. The proximity subsystem 201 can include a proximity sensor element 224 which can be mounted to an arm 218 of a support (not shown). The proximity sensor element 224 can function as an inductor, and it can be made of, e.g., copper wire or any other material suitable for the described purpose. For example, a segment of copper wire can be wound around the arm 218 to create the proximity sensor element 224.

The control and processing module 206 can include a drive system module 230, a proximity system module 232, and an analysis module 234. The drive system module 230 can include a power supply 236, an excitation module 238, and/or a detection module 242. The power supply 236, excitation module 238, and detection module 242, can generally function similarly power supply 136, excitation module 138, and detection module 142, as described above with regard to sensor system 100. The proximity system module 232 can include an AC signal generator 244 and a proximity module 246, and can be configured to send and receive signals to and from the proximity subsystem 201. The analysis module 234 can include a gap processing module 248, and a gap compensation module 250, and can be configured to send and receive signals to and from the drive subsystem, the proximity subsystem 201, the drive system module 230, and the proximity system module 232.

As described above with regard to sensor system 100, stress in a target 210 can be determined by detecting a first magnetic flux that travels through the target 210. As an example, the target 210 can be a shaft that can be rotatable about an axis A2. The first magnetic flux can be detected by detection elements (not shown) of the sensor assembly, which can generate raw stress signals based on the detected first magnetic flux. Although changes in the detected first magnetic flux can be a result of changes in stress within the target 210, the changes in the detected first magnetic flux can also be dependent on changes in the size of a gap G2. Gap G2 can correspond to a gap distance between a distal end of an arm of the sensor head where the drive element can be located and the surface 226 of the target 210, as described with regard to gap G1 above. The size of the gap G2 between a distal end 228 of arm 218 and a surface 226 of a target 210 can be determined using a proximity sensor element 224, which can generate a raw proximity signal that can be delivered to a gap processing module 248.

In the illustrated embodiment, the AC signal generator 244 of the proximity system module 232 can deliver an initial proximity signal 245 to the proximity module 246 which can deliver an input proximity drive signal 247 to the proximity sensor element 224. The proximity module 246 can adjust or modify the initial proximity signal 245, thereby generating the input proximity drive signal 247, as well as monitor returned signals detected by the proximity sensor element 224. The input proximity drive signal 247 can be, e.g., an AC signal. Accordingly, the proximity sensor element 224 can generate a magnetic field that can couple to the target 210. Therefore, a magnetic flux (not shown), corresponding to the magnetic field created by the proximity sensor element 224, can travel through the target 210. If the size of the gap G2 changes, the strength of the magnetic coupling of the magnetic field created by the proximity sensor element 224 and the target 210 can change. Accordingly, an impedance of the proximity sensor element 224 can change. For a given initial proximity signal 245, if the impedance of the proximity sensor element 224 changes, the input proximity drive signal 247 delivered to the proximity sensor element 224 can change.

The gap processing module 248 can measure a reference signal 252, based on the initial proximity signal 245, and a raw proximity signal 254. This raw proximity signal 254 can be dependent on the input proximity drive signal 247 delivered to the proximity sensor element 224. As an example, the reference signal 252 and raw proximity signal 254 can correspond to voltages measured across an isolating resistor, or buffer resistor, which can be a part of the proximity module 246.

The gap processing module 248 can use the reference signal 252 and the raw proximity signal 254 to calculate the impedance of the proximity sensor element 224. The gap processing module 248 can then generate a gap signal 258 which can be proportional to the impedance of the proximity sensor element 224. A gap compensation module 250 can receive the gap signal 258 from the gap processing module 248, as well one or more raw stress signals 260 from detection elements of the sensor assembly, or from the detection module 242 of the drive system module 230.

The gap compensation module 250 can use the gap signal 258 and raw stress signals 260 to calculate one or more corrected stress signals 262. The corrected stress signals 262 can correspond to values of stress in the target 210. Additionally, stress vectors can be determined based on different raw stress signals from each of the detection elements. Therefore, increasing the number of detection elements on the sensor head can increase the resolution of the stress vectors.

In some embodiments the processing and control module 206 an actively or passively filter signals. In some embodiments, the gap processing module 248 can employ active or passive filtering techniques to filter the raw proximity signal 254 and/or the reference signal 252, thereby creating a filtered raw proximity signal 254 and/or a filtered reference signal 252. As another example, the proximity module 246 can employ active or passive filtering techniques to filter the initial proximity signal 245, thereby creating a filtered reference signal 252. Alternatively, the reference signal 252 can be the same as the initial proximity signal 245. In some embodiments the gap processing module 248 can employ active or passive filtering techniques to filter the reference signal 252, thereby creating a filtered reference signal. In some embodiments, the gap compensation module 250 can employ active or passive filtering techniques to filter raw stress signals 260, thereby creating filtered raw stress signals. Additionally, the gap compensation module 250 can filter the gap signal 258.

Figure 3A:
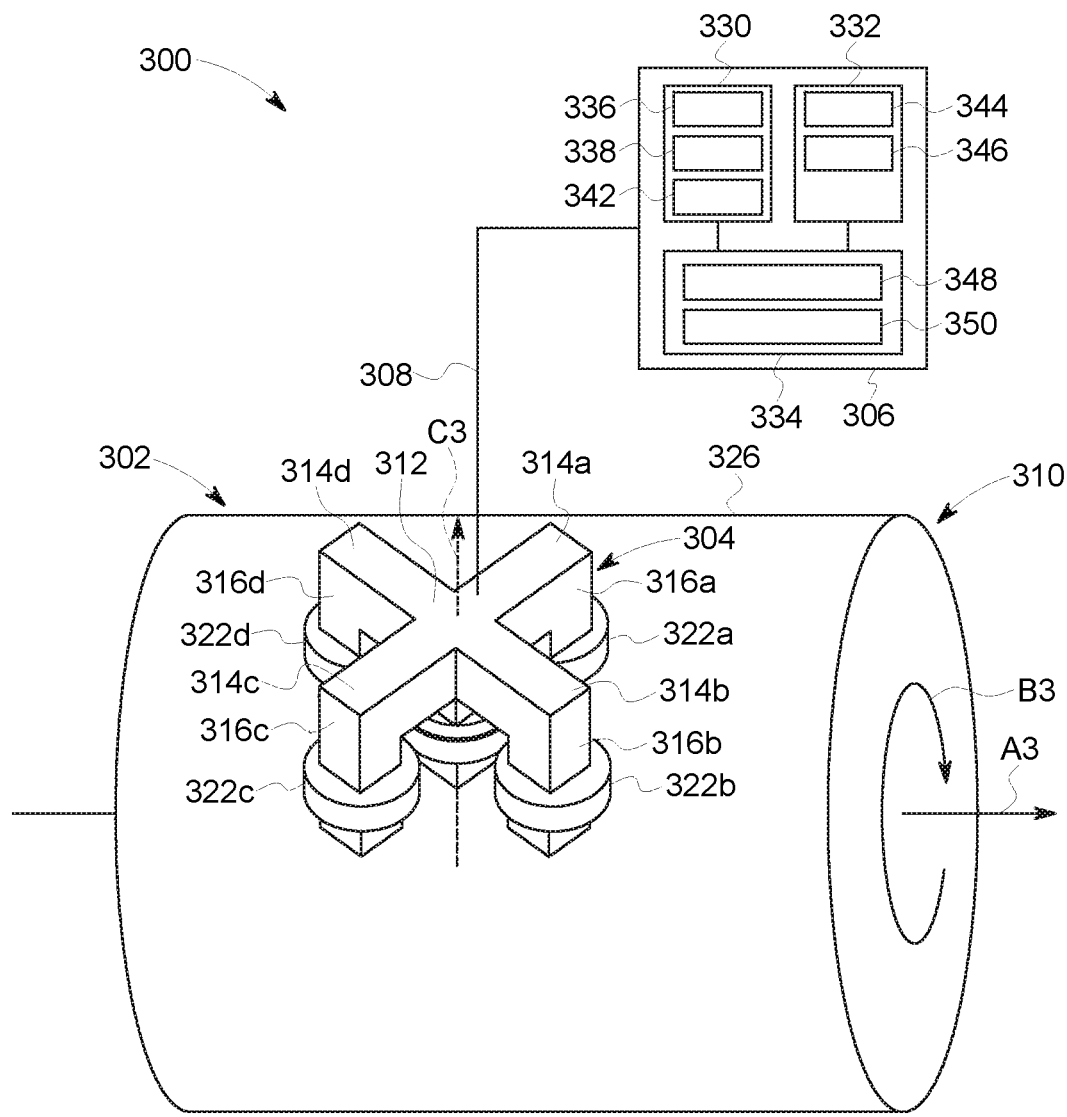
FIG. 3A is a side perspective view of one embodiment of sensor system for sensing stress that includes a proximity sensor element co-located with a drive element.
Figure 3B:
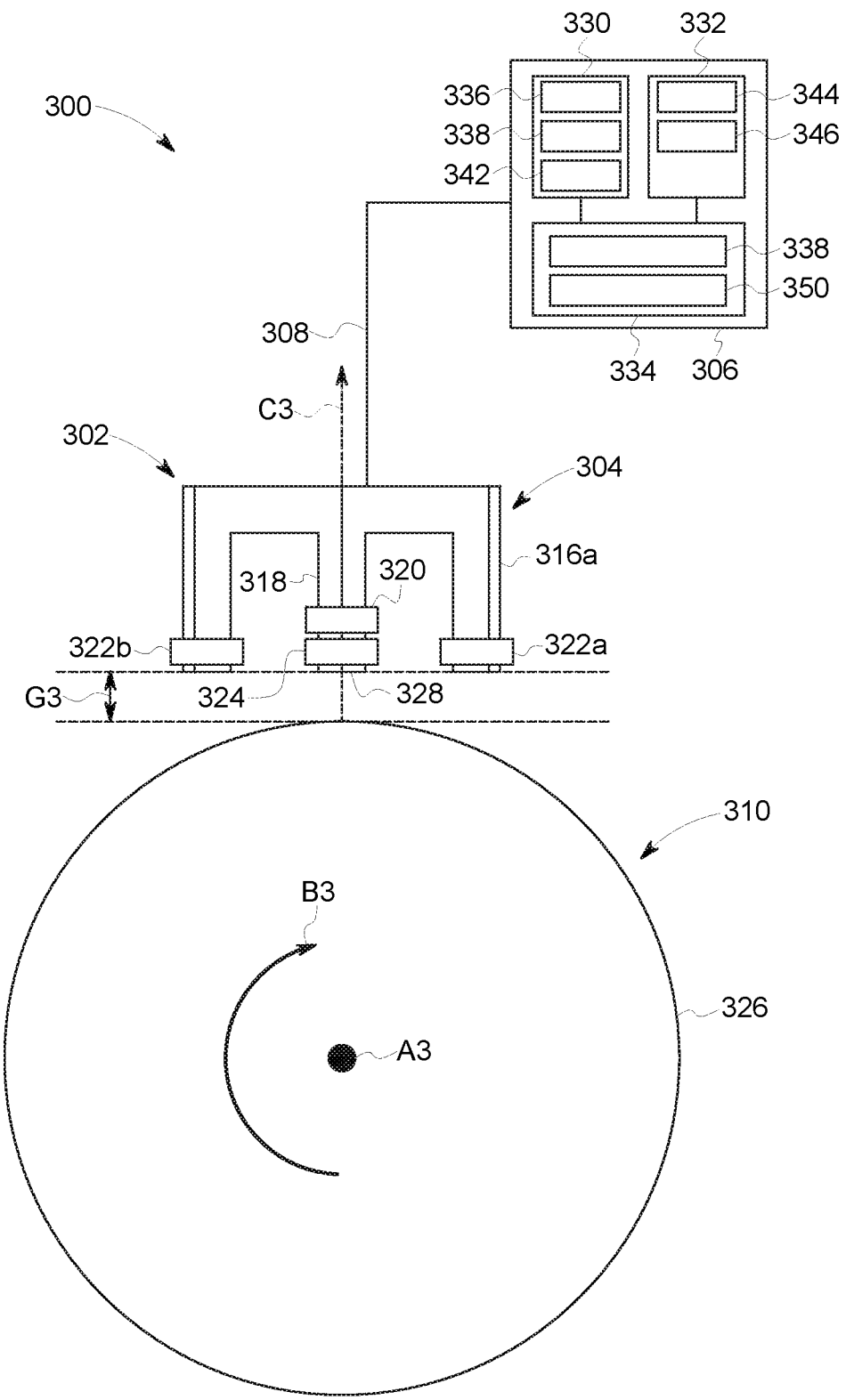
FIG. 3B is a side view of the sensor system of FIG. 3A.
Figure 3C:
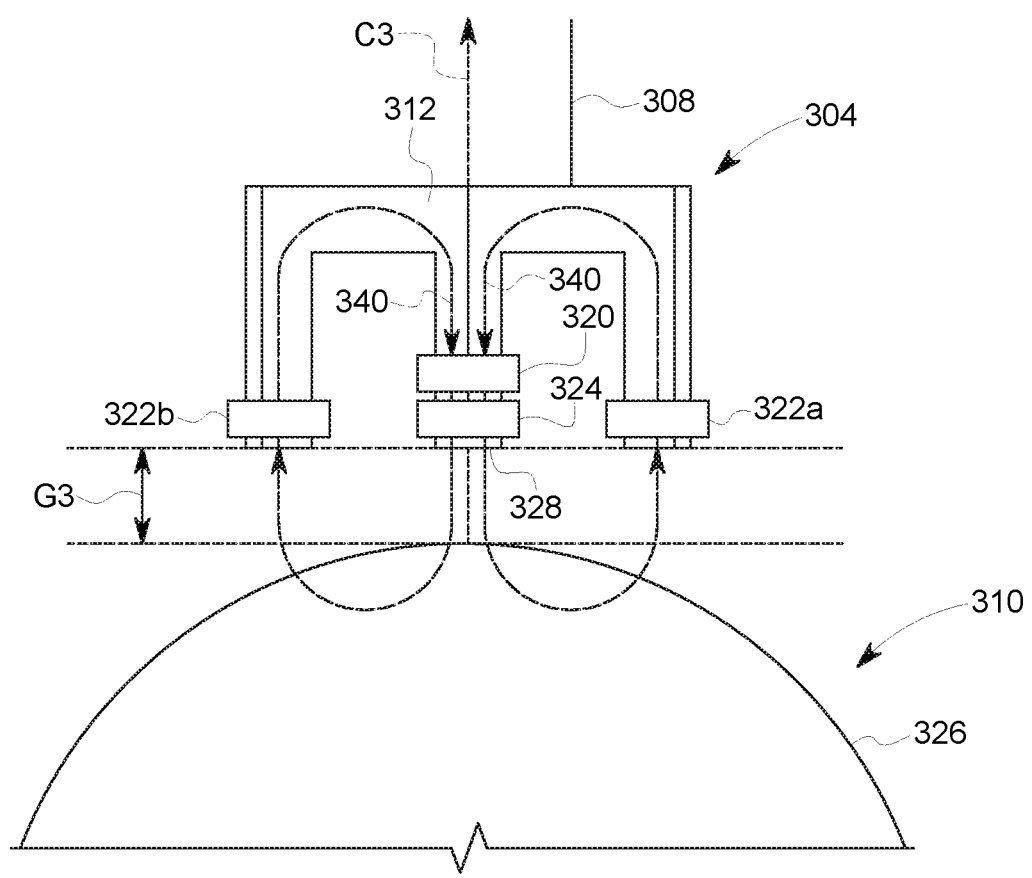
FIG. 3C is an enlarged side view of the sensor system shown in FIG. 3B.

FIGS. 3A-3C show another embodiment of a sensor system 300 for sensing stress such as torque, bending, and axial loading, induced in a conductive target. The stress sensor system 300 can generally be similar to stress sensor system 100, but in this embodiment the stress sensor system 300 can include a proximity sensor element 324 on a central arm 318 for detecting the size of gap G3. FIG. 3A shows a perspective view of the sensor system 300, FIG. 3B shows a side view, and FIG. 3C shows an enlarged side view. The sensor system 300 can include a sensor assembly 302 having a sensor head 304 and a housing (not shown), as well as a control and processing module 306. The sensor assembly 302 can be connected to the control and processing module 306 via a cable 308 which can have multiple wires that can connect to components of the sensor head 304. The control and processing module 306 can function to send and receive signals to and from the sensor assembly 302.

As shown in FIGS. 3A-3C, the sensor assembly 302, including the sensor head 304, can be positioned over a target 310 which can rotate about axis A3, as indicated by arrow B3. The sensor head 304 can include a support 312 that can have support bars 314a, 314b, 314c, 314d that extend radially outward from a central axis C3. The support 312 can generally be similar to support 112. The support bars 314a, 314b, 314c, 314d can have detection arms 316a, 316b, 316c, 316d that extend distally from the support bars 314a, 314b, 314c, 314d toward the target 310. Additionally, the support 312 can include a central arm 318 that extends distally toward the target 310 along the central axis C3. The detection arms 316a, 316b, 316c, 316d can be spaced equidistant from the central arm 318, as well as equidistant from each other. Although the illustrated support 312 shows the detection arms spaced equidistant from each other, other embodiments can have support arms that are spaced at various asymmetric intervals.

The sensor head 304 can further include a drive subsystem and a proximity subsystem. The drive subsystem can include a drive element 320 located on the central arm 318 of the support 312, and detection elements 322a, 322b, 322c, 322d located on the detection arms 316a, 316b, 316c, 316d. The proximity subsystem can include the proximity sensor element 324 co-located on the central arm 318 with the drive element 320. The drive element 320, detection elements 322a, 322b, 322c, 322d, and proximity sensor element 324 can generally be similar to drive element 120, detection elements 122a, 122b, and proximity sensor element 224.

As shown in FIGS. 3B-3C, the sensor head 304 can be positioned above a surface 326 of the target 310 where there is some gap G3 between a distal end 328 of the central arm 318 and the surface 326 of the target 310. As described above with regard to proximity sensor element 224, the proximity sensor element 324 can generate a raw proximity signal corresponding to the size of gap G3 between the distal end 328 of the central arm 318 and the surface 326 of the target 310.

As stated above, the control and processing module 306 can function to send and receive signals to and from the sensor assembly 302. The control and processing module 306 can include a drive system module 330, a proximity system module 332, and an analysis module 334. The drive system module 330 can include a power supply 336, an excitation module 338, and a detection module 342. The power supply 336, excitation module 338, and detection module 342 can generally be similar to power supply 136, excitation module 138, and detection module 142. The proximity system module 332 and analysis module 334 can generally be similar to proximity system module 232 and analysis module 234. The proximity system module 332 can include an AC signal generator 344 and a proximity module 346. The analysis module 334 can include a gap processing module 348, and a gap compensation module 350.

The power supply 336 of the drive system module 330 can deliver an initial drive signal to the excitation module 338 which can generate an input stress drive signal that can be delivered to the drive element 320 such that a first magnetic flux 340, corresponding to a first magnetic field, can be generated in the central arm 318 of the support 312. The excitation module 338 can adjust, filter, and/or modify the initial drive signal, thereby generating the input stress drive signal that can be delivered to the drive element 320, as well as monitor returned signals detected by the drive element 320. In some embodiments, the initial drive signal can be the same as the input stress drive signal. The input stress drive signal can be, e.g., an AC signal at a first frequency. The first magnetic flux 340 can travel from the central arm 318, through the gap G3, through the target 310, through the detection arms 316a, 316b, 316c, 316d, and back to the central arm 318 to form a magnetic loop. As the magnetic flux 340 travels through the detection arms 316a, 316b, 316c, 316d, the detection elements 322a, 322b, 3222c, 322d can detect the magnetic flux 340, and generate raw stress signals, based on the detected magnetic flux 340, which can be delivered to a detection module 342. In some embodiments, the detection module 342 can employ active or passive filtering techniques to filter raw stress signals, thereby creating filtered raw stress signals.

Although not illustrated, the drive element 320 and detection elements 322a, 322b, 322c, 322d can have wires attached thereto, which can allow the elements 320, 322a, 322b, 322c, 322d to communicate with the control and processing module 306, where the wires can be bundle into cable 308. The raw stress signals can be current signals or voltage signals. Both amplitude and phase of the voltage, and/or current, signals can be measured. Although both current and voltage can be measured, it can be preferable to measure voltage since current measurements can have a relatively low signal to noise ratio.

As described above, the magnetic properties of the target can be altered if a stress state of the target 310 is altered. Therefore, changes in the detected magnetic flux 340 can correspond to changes in the stress state of the target 310. However, the detected magnetic flux 340 can also be sensitive to the size of gap G3. Therefore, the raw stress signals, corresponding to the detected magnetic flux, can vary based on the stress state of the target 310 as well as the size of gap G3. Accordingly, it can be desirable to know the size of gap G3 so that the raw stress signal can be corrected based on the size of the gap G3, and a corrected stress signal can be determined.

The size of gap G3 can be determined using the proximity sensor element 324, as described above with regard to proximity sensor element 224 shown in FIG. 2. The proximity sensor element 324 can generate a raw proximity signal which can be delivered the control and processing module 306. The magnitude of the raw proximity signal can be proportional to the size of gap G3.

In operation, the AC signal generator 344 of the proximity system module 332 can deliver an initial proximity signal to the proximity module 346 which can deliver an input proximity drive signal to the proximity sensor element 324. The input proximity drive signal can be, e.g., an alternating current (AC) signal at a second frequency. Accordingly, the proximity sensor element 324 can generate a magnetic field that can couple to the target 310. Therefore, a second magnetic flux, corresponding to the magnetic field created by the proximity sensor element 324, can travel through the target 310. If the size of gap G3 changes, the strength of the magnetic coupling of the magnetic field created by the proximity sensor element 324 and the target 310 can change. Accordingly, an impedance of the proximity sensor element 324 can change.

In an exemplary embodiment, the magnitude of the second frequency can be at least ten times greater than the magnitude of the first frequency. That is, the frequency of the input proximity drive signal can be at least ten times greater than the frequency of the input stress drive signal in order to avoid interference between the drive subsystem and the proximity subsystem. By controlling the frequencies of the input stress drive signal and the input proximity drive signal independently, the drive subsystem and the proximity subsystem can be individually optimized to serve their respective purposes and minimize interference.

For a given initial proximity signal, if impedance of the proximity sensor element 324 changes, the input signal delivered to the proximity sensor element 324 can change. Therefore, the raw proximity signal, dependent on the input proximity drive signal which can vary with impedance of the proximity sensor element 324, can be measured by the gap processing module 348. As described above with regard to gap processing module 248, the gap processing module 348 can employ active or passive filtering techniques to filter the raw proximity signal, thereby creating a filtered raw proximity signal.

The gap processing module 348 can also measure a reference signal, based on the initial proximity signal, from the proximity module 346. The reference signal and the raw proximity signal, both of which can be filtered or unfiltered, can be current signals or voltage signals. Both amplitude and phase of the voltage, and/or current, signals can be measured. Although both current and voltage can be measured, it can be preferable to measure voltage since current measurements can have a relatively low signal to noise ratio. Therefore, the reference signal and raw proximity signal can be measured across a buffer resistor, or current limiting resistor, of the proximity module 346.

In some embodiments, the gap processing module 348 can employ active or passive filtering techniques to filter the reference signal, thereby creating a filtered reference signal. As another example, the proximity module 346 can employ active or passive filtering techniques to filter the initial proximity signal, thereby creating a filtered reference signal. Alternatively, the reference signal can be the same as the initial proximity signal.

The gap processing module 348 can use the reference signal and the raw proximity signal to calculate the impedance of the proximity sensor element 324. The gap processing module 348 can then generate a gap signal which can be proportional to the impedance of the proximity sensor element 324. It can be beneficial to use impedance of the proximity sensor element 324 rather than, e.g., inductance, because it can allow for simpler circuits to be used within the gap processing module 348, as well as simplifying the calculation.

The gap compensation module 350 can receive the gap signal from the gap processing module 348, as well as raw stress signals, which can be filtered or unfiltered, from the detection module 342. In some embodiments, the gap compensation module can receive the raw stress signals from the detection elements 322*a*, 322*b*, 322*c*, 322*d*. The gap compensation module 350 can further filter and/or amplify the gap signal and/or the raw stress signals, and use gap signal and raw stress signals to calculate corrected stress signals. The corrected stress signals can correspond to values of stress in the target 310.

As described above, the initial drive signal, initial proximity signal, raw stress signals, and the raw proximity signal can be filtered. For example, filtering methods utilizing inductors and capacitors can ensure that loop impedance is high for interfering signals. Small capacitance values in series with the proximity sensor element 324 can ensure that the magnetic flux 340, at low frequency, from the drive element 320 does not couple significantly. An inductance of the detection elements 322*a*, 322*b*, 322*c*, 322*d*, which can be added or be a characteristic of the detection elements 322*a*, 322*b*, 322*c*, 322*d*, can ensure that the magnetic flux created by the proximity sensor element 324, at high frequency, has a limited interference effect on the detection elements 322*a*, 322*b*, 322*c*, 322*d*. Any other component of the control and processing module 306 can employ similar signal filtering techniques.

Figure 4:
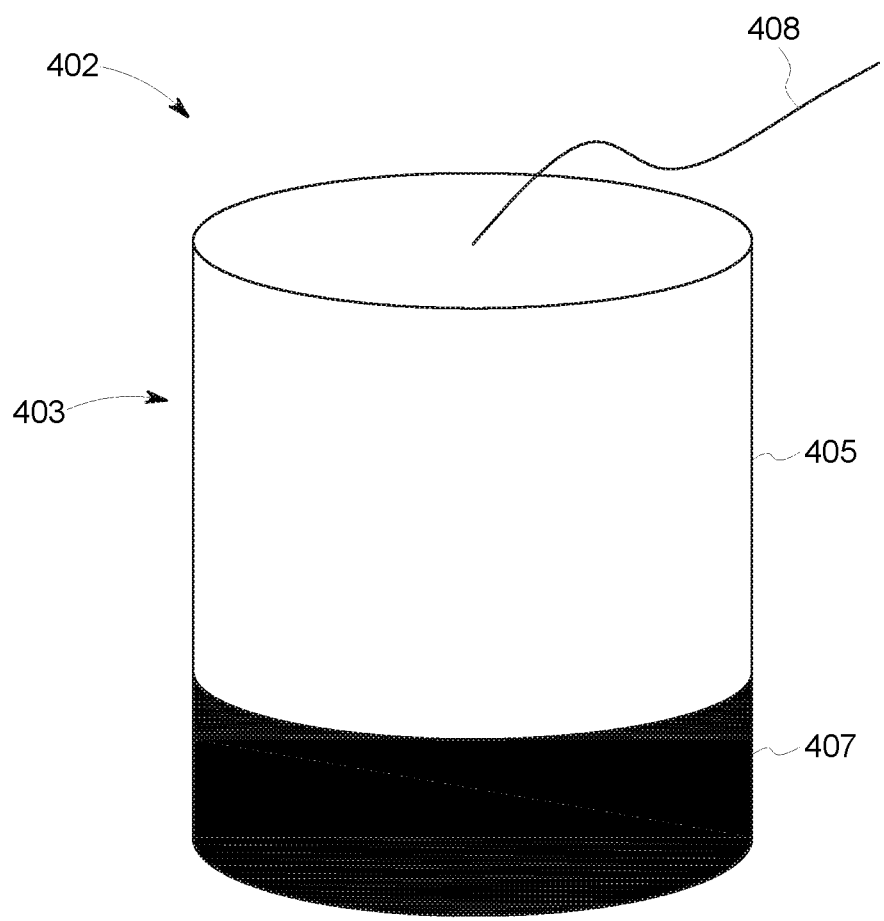
FIG. 4 is a perspective view of an embodiment of a sensor assembly with a housing.

FIG. 4 shows another embodiment of a sensor assembly 402 that includes a housing 403 having a cable 408 attached thereto. The sensor assembly 402 can generally be similar to sensor assembly 302, and it can be used in a sensor system that can generally be similar to sensor system 300. Therefore, the sensor assembly 402 can include the housing 403 which, while not shown, can have a sensor head having a support, a drive subsystem, and a proximity subsystem disposed therein. The drive subsystem can include a drive element and least one detection element, and the proximity subsystem can include a proximity sensor element as explained above. The sensor head, support, drive element, detection elements, and proximity sensor elements can be similar to sensor head 304, support 314, drive element 320, detection elements 322*a*, 322*b*, 322*c*, 322*d*, and proximity sensor element 324.

The housing 403 can include a proximal portion 405 and a distal portion 407. The proximal portion 405 can be made out of, e.g., stainless steel, aluminum, or another metal. The distal portion 407, where the drive subsystem and proximity subsystem can reside, can be made out of a non-conductive material such as, e.g., a ceramic or a moldable, machinable, polymer. The non-conductive nature of the distal portion 407 can function to prevent magnetic fields generated by the drive and proximity sensor elements from coupling with the housing 403.

Rather than including a proximity sensor element co-located with a drive element on an arm of a support, it can be desirable to include a proximity sensor element on a support that is separate from the support that the drive element is on. For example, stress sensor heads can be constructed to maximize magnetic coupling to a target. Maximized coupling can improve sensitivity when detecting a magnetic flux that can correspond to changes in stress within the target. However such coupling can also increase the sensitivity to electrical runout sources on the target. If a proximity sensor element is co-located with a drive element, the electrical runout can generate a significant amount of noise in a raw proximity signal from a proximity sensor element, which can increase an error associated with the raw proximity signal. Such a condition can be minimized by constructing a proximity sensor element and a drive element on separate supports. Interference between a magnetic field created by the drive element and a magnetic field created by the proximity sensor element can also be reduced. The configuration can allow for improved optimization of the drive subsystem and the proximity subsystem.

Figure 5A:
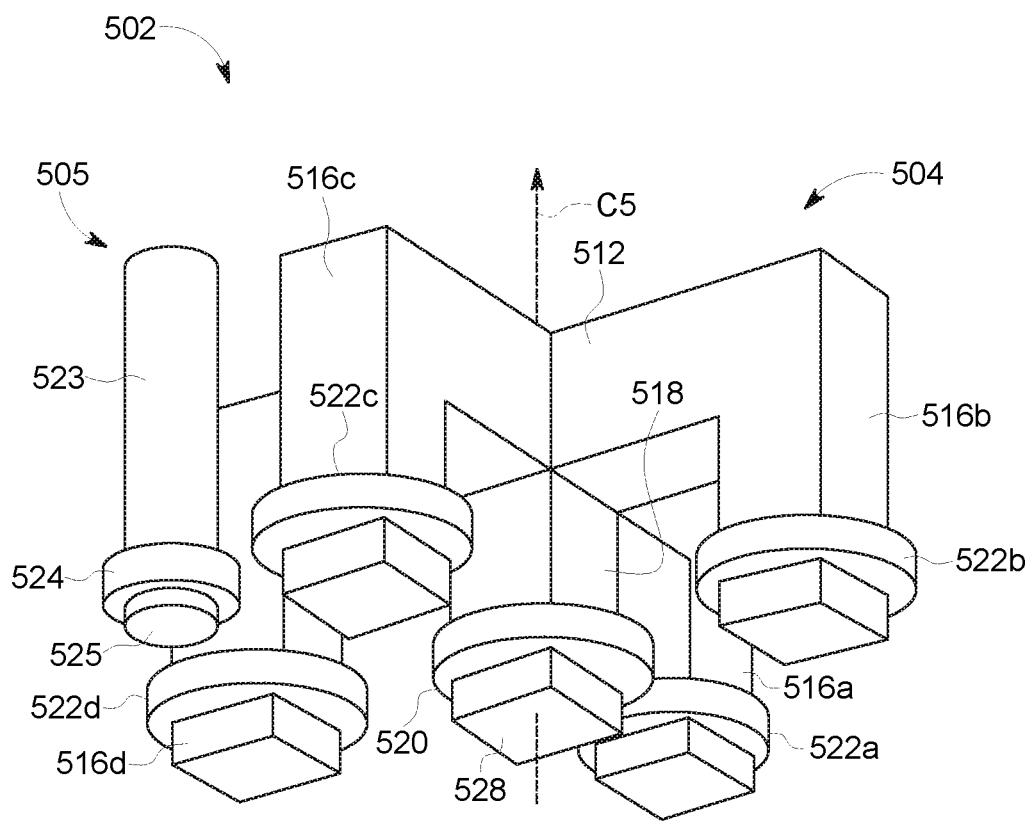
FIG. 5A is a side perspective view of an embodiment of a sensor assembly that includes a drive sensor head and a proximity sensor head.
Figure 5B:
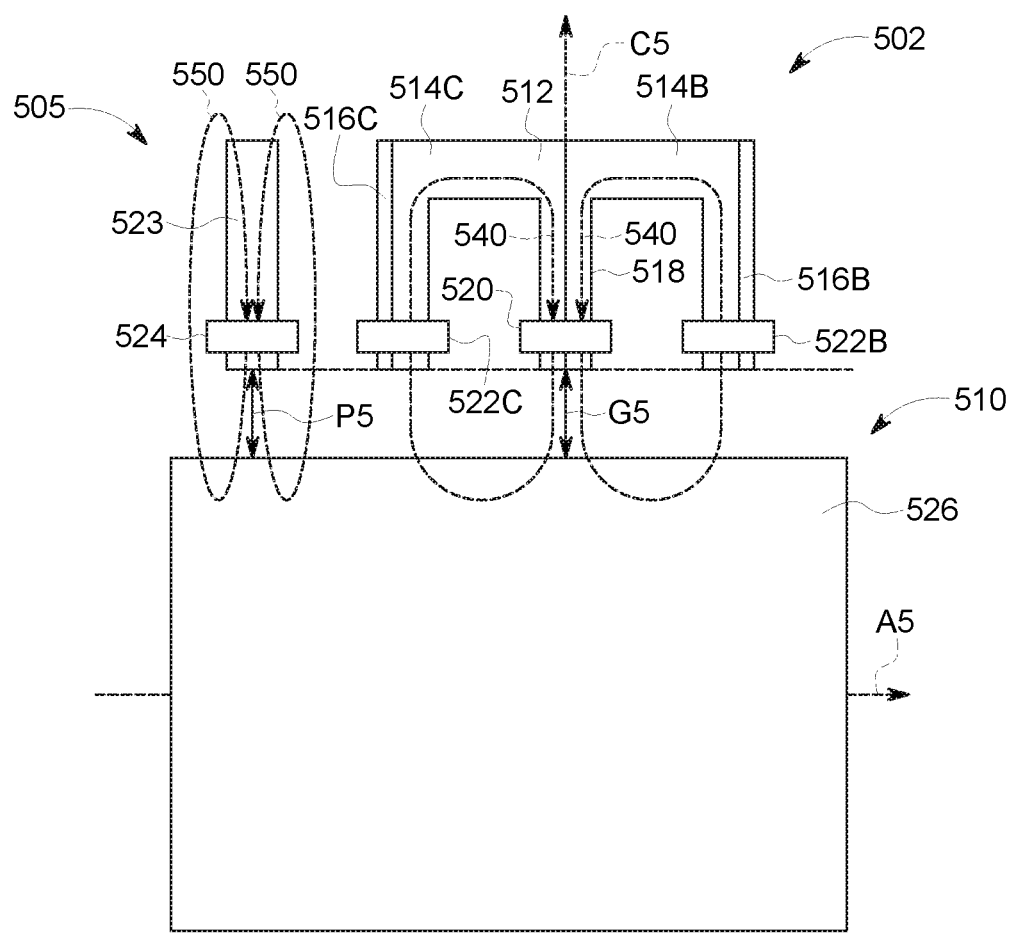
FIG. 5B is a side view of the sensor assembly of FIG. 5A.
Figure 5C:
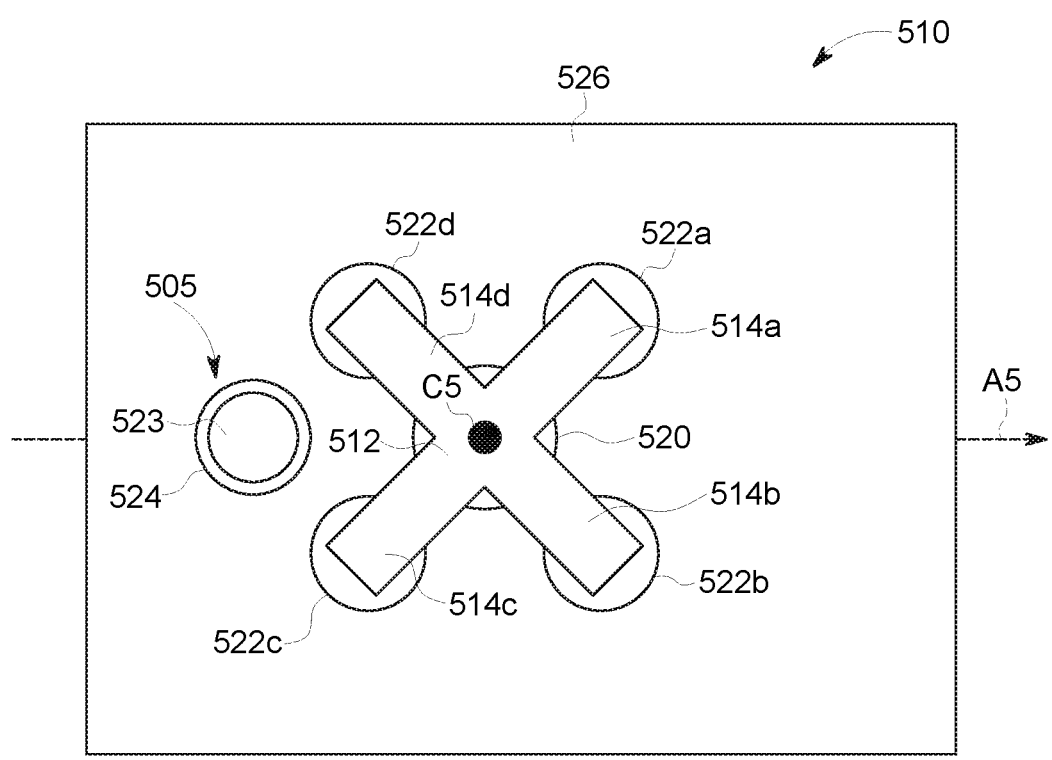
FIG. 5C is a top view of the sensor assembly of FIG. 5B.

FIGS. 5A-5C show an exemplary embodiment of a sensor assembly 502 that can include a drive sensor head 504 and a separately supported proximity sensor head 505. The sensor assembly 502 can function similarly to sensor assembly 302. The sensor assembly 502 can include the drive sensor head 504 and the proximity sensor head 505. The assembly can be disposed in a housing (not shown) such as a housing as shown in FIG. 4. The sensor assembly 502 can be connected to a control and processing module, similar to control and processing module 206, 306 via a cable (not shown) which can have multiple wires that can connect to components of the sensor heads 504, 505.

As shown in FIGS. 5A-5B, the drive sensor head 504 can include a first support 512 having support bars 514a, 514b, 514c, 514d that extend outward from a central axis C5. The support bars 514a, 514b, 514c, 514d can have detection arms 516a, 516b, 516c, 516d that can extend distally toward a surface 526 of a target 510. The target 510 can be, e.g., a shaft that can be rotatable about axis A5. Detections elements 522a, 522b, 522c, 522d can be located near distal ends of the arms 516a, 516b, 516c, 516d. The support 512 can further include a central arm 518 where a drive element 520 can be located. The orientations of the drive sensor head 504 and the target 510 can generally be similar to sensor head 204 and target 210, shown in FIGS. 2A-2C. The proximity sensor head 505 can include a proximity sensor element 524 located near a distal end 525 of a proximity arm 523, which can be part of a second support. The proximity arm 523 can also be the entire support, as shown in FIG. 5A.

In operation, the control and processing module can function to send and receive signals to and from the drive element 520, detection elements 522a, 522b, 522c, 522d, and proximity sensor element 524 as described above with regard to sensor system 300.

The control and processing module can deliver an input stress drive signal to the drive element 520 such that a first magnetic flux 540 can be generated in the central arm 518 of the support 512. The input stress drive signal can be, e.g., an AC signal at a first frequency. The first magnetic flux 540 can travel from the central arm 518, through a gap G5 between a distal end 528 of the central arm 518 and the surface 526 of the target 510, through the target 510, through the detection arms 516a, 516b, 516c, 516d, and back to the central arm 218 to form a magnetic loop. The gap G5 between the distal end 528 of the central arm 518 and the surface 526 of the target 510 can be called a drive gap G5. As the magnetic flux travels through the detection arms 516a, 516b, 516c, 516d, the detection elements 522a, 522b, 522c, 522d can detect the magnetic flux, and output raw stress signals, based on the detected magnetic flux, which can be delivered to the control and processing module.

The control and processing module can also deliver an input proximity drive signal to the proximity sensor element 524. The input proximity drive signal can be, e.g., an AC signal at a second frequency. Accordingly, the proximity sensor element 224 can generate a magnetic field that can couple to the target 510. Therefore, a second magnetic flux 550, corresponding to the magnetic field created by the proximity sensor element 524, can travel through the proximity arm 523, through a gap between the distal end 525 of proximity arm 523 and the surface 526 of the target 510, and through the target 510. The gap between the distal end 525 of the proximity arm 523 and surface 526 of the target 510 can be called a proximity gap P5.

As described above with regard to sensor system 300, the frequency of the input proximity drive signal can be at least ten times greater than the frequency of the input stress drive signal in order to avoid interference between the first magnetic flux 540 from the drive element and the second magnetic flux 550 from the proximity sensor element. By controlling the frequencies of the input stress drive signal and the input proximity drive signal independently, the drive subsystem and the proximity subsystem can be individually optimized to serve their respective purposes and minimize interference.

If the size of the proximity gap P5 changes, the strength of the magnetic coupling of the magnetic field created by the proximity sensor element 524 and the target 510 can change. Accordingly, an impedance of the proximity sensor element 524 can change. In this case, the distal end 525 of the proximity arm 523 can be aligned with the distal end 528 of the central arm 518 of the first support 512 such that the drive gap G5 and the proximity gap P5 can be approximately equal. Alternatively, the difference between the drive gap G5 and the proximity gap P5 can be known such that it can be accounted for prior to, or during, a calculation to determine a corrected stress signal or value.

Raw stress signals from the detection elements 522a, 522b, 522c, 522d, and a raw proximity signal from the proximity sensor element 524, can be delivered to the control and processing module, and can be used to determine a corrected stress signal as described above with regard to sensor system 300.

By constructing the proximity sensor element 524 and drive sensor element 520 on separate supports 523, 512, interference between the magnetic flux created by the drive element 520 and the magnetic flux created by the proximity sensor element 524 can be minimized. Therefore, the raw stress signal and the raw proximity signal can require less filtering, and simpler circuits can be used to determine a corrected gap signal. In some embodiments or applications, a benefit can be that the drive sensor head 504 and the proximity sensor head 505 can be optimized to perform their respective functions. By constructing the drive element 520 and the proximity sensor element 524 on separate supports 512, 523, coupling between the drive element 520 and the proximity sensor element 524 can be reduced. This can be beneficial, e.g., when scaling an input dynamic range of frontend electronics, or when filtering a raw proximity signals or raw stress signals.

As illustrated in FIGS. 5A-5C, detection elements 522c, 522d are located closer to the proximity sensor element 524 than detection elements 522a, 522b. Therefore, it is possible that the detection elements 522a, 522b, 522c, 522d can experience different levels of interference, or noise, from the proximity sensor element 524, dependent on the distance from the proximity sensor element 524. In some embodiments, a sensor assembly can include a second proximity sensor head on the opposite side of the drive sensor head 504. Incorporating a second proximity sensor head can help ensure that interference observed by detection elements on the drive sensor head is approximately equal across all of the detection elements.

Figure 6A:
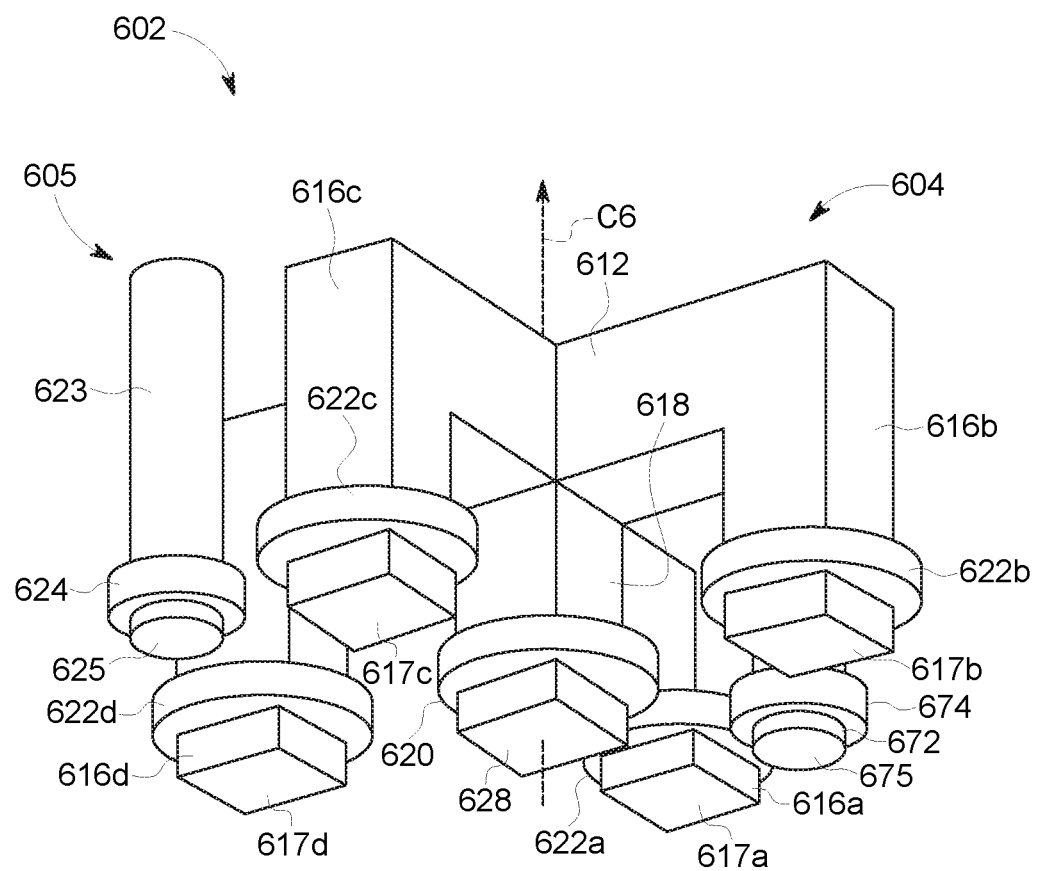
FIG. 6A is a perspective view of another embodiment of a sensor assembly that includes a drive sensor head and two proximity sensor heads.
Figure 6B:
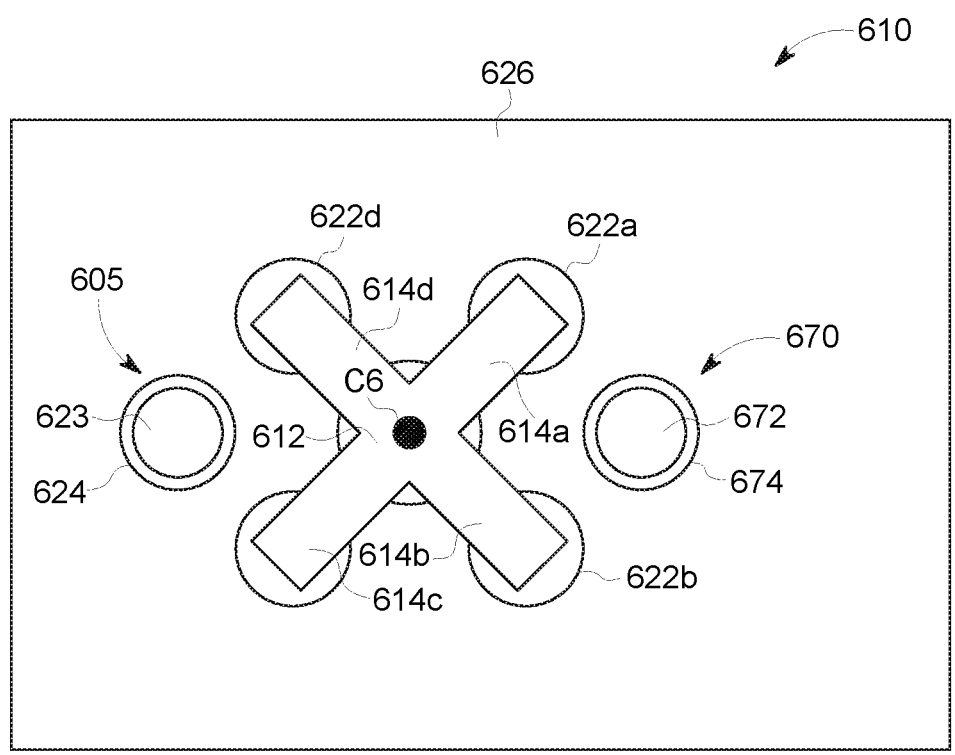
FIG. 6B is a top view of the sensor assembly of FIG. 6A.

FIGS. 6A-6B show another embodiment example of a sensor assembly 602. The sensor assembly 602 can generally be similar to sensor assembly 502, but can include a second proximity sensor head 670, along with a first proximity sensor head 605, a drive sensor head 604, and a housing (not shown). The sensor assembly 602 can be connected to a control and processing module, similar to control and processing modules 206, 306, via a cable which can have multiple wires that can connect to components of the sensor heads 504, 505.

As shown in FIGS. 6A-6B, the drive sensor head 604 can include a first support 612 having support bars 614a, 614b, 614c, 614d that extend outward from a central axis C6. The support bars 614a, 614b, 614c, 614d can have detection arms 616a, 616b, 616c, 616d that can extend distally toward a surface 626 of a target 610. Detections elements 622a, 622b, 622c, 622d can be located near distal ends 617a, 617b, 617c, 617d of the arms 616a, 616b, 616c, 616d. The support 612 can further include a central arm 618 where the drive element 620 can be located. The orientations of the drive sensor head 604 and the target 610 can generally be similar to sensor head 504 and target 510, shown in FIGS. 5A-5C.

The first proximity sensor head 605 can include a first proximity sensor element 624 located near a distal end 625 of a first proximity arm 623, which can be part of a second support. The first proximity arm 623 can also be the entire second support, as shown in FIG. 6A. The second proximity sensor head 670 can be similar to the first proximity sensor head 605. The second proximity sensor head 670 can include a second proximity sensor element 674 located near a distal end 675 of a second proximity arm 672, which can be part of a third support. Alternatively, the second proximity arm 672 can be the entire third support, as shown in FIG. 6B.

The sensor heads 604, 605, 670 can be positioned over a surface 626 of a target 610. In operation, the control and processing module can send and receive signals to and from the drive element 620, detection elements 622a, 622b, 622c, 622d, and proximity sensor elements 624, 674 as described above with regard to sensor system 300. An input stress drive signal can be delivered to the drive element 620, and input proximity drive signals can be delivered to proximity sensor elements 624, 674. The input stress drive signal can, e.g., an AC signal at a first frequency, while the input proximity drive signals can be AC signals at a second frequency. The drive sensor head 604 can generally function similarly to drive sensor head 504 to generate a raw stress signal which can be received by the control and processing module. Therefore, the drive element 620 can generate a first magnetic flux that can travel through the target 610. The first and second proximity sensor heads 605, 670 can generally function similarly to proximity sensor head 505 to generate raw proximity signals which can be received by the control and processing module. Accordingly, the first and second proximity sensor elements 624, 674 can generate second and third magnetic fluxes that can travel through the target.

The distal ends 625, 675 of the proximity arms 623, 672 can be aligned such that gaps between the ends 625, 675 of the arms 623, 672 and the surface 626 of the target 610 can be approximately equal. Distal ends 628, 617a, 617b, 617c, 617d of the arms 618, 616a, 616b, 616c, 616d of the support 612 can be aligned with the distal ends 625, 675 of the proximity arms 623, 672 for the same reason. Alternatively, any misalignment between the distal ends 628, 617a, 617b, 617c, 617d, 625, 675 of the arms 618, 616a, 616b, 616c, 616d, 623, 672 can be known such that it can be accounted for prior to, or during, a calculation to determine a corrected stress signal or value.

As shown in FIG. 6B, proximity sensor heads 605, 670 can be positioned equidistant from, and on opposite sides of, the drive sensor head 604. Therefore, each of the detection elements 622a, 622b, 622c, 622d can experience approximately equivalent interference from the proximity sensor elements 624, 674. Such a configuration can simplify data analysis, and allow for simpler circuits to be used to determine a corrected gap signal. For example, each of the raw stress signals from each of the detection elements 622a, 622b, 622c, 622d can be filtered using the same method, or circuitry, without the need to compensate for certain detection elements that experience significantly more interference than others.

Although arms of the supports 112, 312, 512, 612 are illustrated as having square or rectangular cross-sections, the cross-sections of the arms of the supports 112, 312, 512, 612 can be any shape suitable for the described purpose. For example, the arms can be cylindrical and can have circular cross-sections.

Other embodiments are within the scope and spirit of the disclosed subject matter.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A sensor assembly, comprising:
   a housing including a proximal portion and a distal portion;
   a drive sensor head including
      a first support having a first arm oriented with respect to a central axis extending through the drive sensor head, the first support including a drive element configured to induce a first magnetic flux that travels through a target;
      a second support having a second arm;
      a third support having a third arm;
      a fourth support having a fourth arm;
      a fifth support having a fifth arm;
      the drive sensor head including at least one detection element coupled to each of the second, third, fourth, and fifth supports, wherein each of the at least one detection elements is configured to detect the first magnetic flux;

a first proximity sensor head having a first proximity arm and a first proximity sensor element coupled to a distal end of the first proximity arm, the first proximity sensor element located at a first fixed position relative to the at least one detection element; and a second proximity sensor head having a second proximity arm and a second proximity sensor element coupled to a distal end of the second proximity arm, the second proximity sensor element located at a second fixed position relative to the at least one detection element, wherein the first proximity sensor head and the second proximity sensor head are positioned opposite and equidistant from the drive sensor head, and the first proximity sensor element and the second proximity sensor element are configured to generate a second magnetic flux that travels through the target and a raw proximity signal corresponding to a gap distance between the first arm and the target.

2. The sensor assembly of claim 1, wherein the at least one detection element comprises four detection elements being approximately equally spaced from the drive element and from one another.

3. The sensor assembly of claim 1, wherein the drive element is configured to receive an alternating current drive signal at a first frequency to generate the first magnetic flux, and the first proximity sensor element is configured to receive an alternating current input proximity drive signal at a second frequency to generate the second magnetic flux.

4. The sensor assembly of claim 1, wherein a third proximity sensor element is positioned on the first arm of the first support.

5. The sensor assembly of claim 1, wherein a fourth proximity sensor element is on the second support positioned a fixed distance from the first support.

6. The sensor assembly of claim 1, wherein the at least one detection element is on the second arm of the second support.

7. The sensor assembly of claim 1, wherein at least a portion of first support, the second support, and the third support are made of a ferrite material.

8. The sensor assembly of claim 1, wherein the proximal portion of the housing is made of stainless steel or aluminum.

9. The sensor assembly of claim 1, wherein the distal portion of the housing is made of a non-conductive ceramic material or a non-conductive polymer material.

10. The sensor assembly of claim 1, wherein the first proximity sensor head and the second proximity sensor head are positioned opposite and equidistant from the drive sensor head such that each of the at least one detection elements experiences an equivalent amount of interference from the first proximity sensor element and the second proximity sensor element.

11. A sensor system, comprising:
a sensor assembly for sensing stress in a target, the sensor assembly having
  a housing including a proximal portion and a distal portion; and
  a drive sensor head including
    a first support having a first arm oriented with respect to a central axis extending through the drive sensor head, the first support including a drive element configured to induce a first magnetic flux that travels through a target,
    a second support having a second arm,
    a third support having a third arm;
    a fourth support having a fourth arm;
    a fifth support having a fifth arm,
    the drive sensor head including at least one detection element coupled to each of the second, third, fourth, and fifth supports, wherein each of the at least one detection elements is configured to detect the first magnetic flux;
  a sixth support having a first proximity arm;
  a seventh support having a second proximity arm;
  a first subsystem configured to generate a raw stress signal;
  a second subsystem having a first proximity sensor element coupled to a distal end of the first proximity arm, the first proximity sensor element positioned opposite and equidistant from the drive sensor head and located at a first fixed distance relative to at least one detection element;
  a third subsystem having a second proximity sensor element coupled to a distal end of the second proximity arm, the second proximity sensor element located at a second fixed distance relative to at least one detection element, wherein the first proximity sensor element and the second proximity sensor elements are positioned opposite and equidistant from the drive sensor head, the second and third subsystems being configured to generate a raw proximity signal;
  a drive system configured to deliver an input stress drive signal to the first subsystem; and
  a proximity system configured to deliver an input proximity drive signal to the second and third subsystems, and generate a reference signal that corresponds to the input proximity drive signal.

12. The sensor system of claim 11, wherein a third proximity sensor element is on the second arm of the second support.

13. The sensor system of claim 11, wherein the proximal portion of the housing is made of stainless steel or aluminum.

14. The sensor system of claim 11, wherein the distal portion of the housing is made of a non-conductive ceramic material or a non-conductive polymer material.

15. The sensor system of claim 11, wherein the first proximity sensor head is positioned opposite and equidistant from the drive sensor head such that each of the at least one detection elements experiences an equivalent amount of interference from the first proximity sensor element and the second proximity sensor head is positioned opposite and equidistant from the drive sensor head such that each of the at least one detection elements experiences an equivalent amount of interference from the second proximity sensor element.

16. The sensor system of claim 11, wherein the first subsystem includes a drive element and at least one detection element, the drive element being located on the first arm of the first support and being configured to induce a first magnetic flux that travels through a target, and the at least one detection element coupled to the second support and configured to detect the first magnetic flux and generate the raw stress signal.

17. The sensor system of claim 16, wherein a second proximity sensor element is on the first arm of the first support.

18. The sensor system of claim 11, further comprising a gap processor configured to receive the reference signal and the raw proximity signal, to calculate an impedance of the proximity sensor element, and to generate a gap signal that is proportional to the impedance of the proximity sensor element.

19. The sensor system of claim 18, further comprising a gap compensation circuit configured to receive the raw stress signal and the gap signal and to generate a corrected stress signal, wherein the corrected stress signal corresponds to a value of stress in the target.

20. A method of sensing stress in a target, comprising:
delivering an input stress drive signal to a drive element located on a first arm of a first support of a drive sensor head of a sensor assembly, the first arm oriented with respect to a central axis extending through the drive sensor head, the input stress drive signal thereby inducing a first magnetic flux that travels through a target, the drive sensor head including,
a first support having a first arm oriented with respect to a central axis extending through the drive sensor head, the first support including a drive element configured to induce a first magnetic flux that travels through a target;
a second support having a second arm;
a third support having a third arm;
a fourth support having a fourth arm;
a fifth support having a fifth arm;
the drive sensor head including at least one detection element coupled to each of the second, third, fourth, and fifth supports, wherein each of the at least one detection elements is configured to detect the first magnetic flux;
detecting the first magnetic flux via at least one detection element,
generating a raw stress signal based on the detected first magnetic flux;
delivering an first proximity signal to a proximity circuit configured in a first proximity sensor head, the first proximity sensor head including a first proximity arm and a first proximity sensor element coupled to the distal end of the first proximity arm, the first proximity sensor element located at a first fixed position relative to the at least one detection element;
delivering a second proximity signal to a proximity circuit configured in a second proximity sensor head, the second proximity sensor head including a second proximity arm and a second proximity sensor element coupled to the distal end of the second proximity arm, the second proximity sensor element located at a second fixed position relative to the at least one detection element, the first proximity sensor head and the second proximity sensor head positioned opposite and equidistant from the drive sensor head;
delivering a first reference signal and a second reference signal to a gap processing module, the first and second reference signals respectively corresponding to the first and second proximity signals;
delivering a first input proximity drive signal and a second input proximity drive signal to the first and second proximity sensor elements, respectively;
generating first raw proximity signal based on an impedance of the first proximity sensor element;
generating second raw proximity signal based on an impedance of the second proximity sensor element;
calculating a gap signal from the reference signal, the first raw proximity signal, and the second raw proximity signal, the gap signal corresponding to an impedance of the first proximity sensor element and the second proximity sensor element; and
calculating a corrected stress signal from the raw stress signal and the gap signal.

21. The method of claim 20, wherein the gap signal is proportional to the impedance of the first proximity sensor element or the second proximity sensor element.

22. The method of claim 20, wherein the first or second proximity sensor elements are configured to generate a second magnetic flux in the target, wherein changes in the second magnetic flux correspond to changes in the impedance of the first or second proximity sensor elements.

23. The method of claim 20, wherein the first proximity sensor head and the second proximity sensor head are positioned opposite and equidistant from the drive sensor head such that each of the at least one detection elements experiences an equivalent amount of interference from the first proximity sensor element and the second proximity sensor element.

24. The method of claim 20, wherein the drive signal and the input proximity drive signal are alternating current signals, and the input stress drive signal is at a first frequency and the input proximity drive signal is at a second frequency.

25. The method of claim 24, wherein the second frequency is at least ten times greater than the first frequency.

* * * * *